United States Patent [19]

Gomes et al.

[11] Patent Number: 4,707,790

[45] Date of Patent: Nov. 17, 1987

[54] CONTROL SIGNAL BUFFER FOR USE IN AN INSERTER SYSTEM

[75] Inventors: John M. Gomes, Huntington; Charles F. Gilson, Sandy Hook, both of Conn.

[73] Assignee: Pitney Bowes Inc., Stamford, Conn.

[21] Appl. No.: 800,232

[22] Filed: Nov. 21, 1985

[51] Int. Cl.[4] ........................ G06F 15/46; B65H 39/02

[52] U.S. Cl. ................................ 364/478; 53/266 A; 270/58

[58] Field of Search ........................ 364/478, 468, 469; 270/53-58; 271/3.1, 4; 53/52, 58, 266 A, 495, 500, 540, 494; 209/554, 608

[56] References Cited

U.S. PATENT DOCUMENTS 3,490,761 1/1970 Bell ................................... 53/495 X 3,606,728 9/1971 Sather et al. ...................... 270/58 X 4,172,347 10/1979 Nitz ........................................ 53/52

4,174,829 11/1979 McCain et al. .................... 270/58 X 4,358,016 11/1982 Richardson et al. ............... 364/478

4,384,196 5/1983 McCumber et al. ............. 270/58 X 4,585,220 4/1986 Zemke et al. ...................... 270/58 X

*Primary Examiner*—Joseph Ruggiero

*Attorney, Agent, or Firm*—Robert H. Whisker; Melvin J. Scolnick; David E. Pitchenik

[57] ABSTRACT

An inserter system having an improved control system. The system includes a sheet inserter system and one or more web modules, for, receiving a web of forms, scanning the forms for information, storing and retransmitting the information, separating the web into discrete forms, and feeding the forms for further processing by the sheet inserter system. The sheet inserter system adds additional sheets to the forms inserts the batches so formed into envelopes and may imprint the envelopes with metered postage. The control system includes a supervisory controller which receives the control information and controls the sheet inserter system and web modules in accordance therewith. A buffer is provided to transfer control information from the supervisory controller to the sheet inserter system. The buffer receives control signals from the supervisory controller synchronously with the transfer of batches of documents from the web modules to the sheet inserter system but does not transmit the control signals to the sheet inserter system unless the transfer is successfully completed.

10 Claims, 3 Drawing Figures

CONTROL SIGNAL BUFFER FOR USE IN AN INSERTER SYSTEM

BACKGROUND OF THE INVENTION

This invention relates to inserter systems which assemble batches of documents, which may be sheets and/or forms, for insertion into envelopes. More particularly it relates to control systems for such inserter systems. (By sheets herein is meant single sheet documents and by forms herein is meant documents which comprise a web and which are separated from such web by such inserter systems).

Such systems are known in the art and are generally used by organizations which make large mailings where the contents of each item mailed may vary. Such systems typically comprise: feeder modules for insertion of sheets into a batch, either multiply or singly; web modules for separating webs into discrete forms and inserting the discrete forms into the batch; a transport system for conveying sheets and forms through the various modules to form proper batches; inserter modules for inserting the batches into envelopes, which are preferably preaddressed; optionally, meter modules for metering the envelopes with appropriate postage; and a control system to synchronize the operation of the inserter system to assure that the batches are properly assembled, inserted into envelopes, and, possibly, metered.

Information for control of such known inserters system is read from a control document, which is preferably a form, by a scanner associated with the feeder module or web module which feeds that document. Preferably that module is the most upstream module along the transport system. The scanner reads information from the control document which typically includes information such as information defining the number of documents to be inserted at each module, information providing an I.D. code for comparison with I.D. codes on inserted documents to assure that documents are properly matched, and, possibly, information for other purposes such as selection of postage. This control information is then transmitted to the control system which controls the operation of the inserter system accordingly to assure the proper assembly and processing of each batch as defined by a control document.

As noted above control documents are preferably forms since compilation of the control information for each batch is most readily done through data processing with output through a line printer onto a web of computer printout forms. Accordingly, inserter systems generally comprise an upstream web module, or modules, which feed accumulations of forms (i.e., a control form and optionally, one or more succeeding non-control forms from the web) into a sheet inserter system; including feeder modules, inserter modules and, possibly, postage meter modules, where appropriate sheets would be inserted to complete the batch, the batch inserted into an envelope, and, possibly, postage indicia imprinted. Such sheet inserter systems are known and typical examples are described in U.S. Pat. No.: 3,606,728; issued: Sept. 21, 1971; to: Sather et al; assigned to Bell and Howell Co.; and U.S. Pat. No.: 3,935,429; issued: Jan. 27, 1976; to: Branecky et al; assigned to: Pitney Bowes Inc.

Web modules comprise a forms feeder which feeds a web of forms into a burster-folder, where the web is separated into discrete forms, which may be folded to fit into an envelope, if necessary, and a scanner which reads information from the web. To prevent accidental pre-mature bursting a slack loop of web is maintained between the forms feeder and the burster-folder.

The mechanical construction and operation of web modules is well understood by those skilled in the art as is, as mentioned above, the control, construction and operation of conventional sheet inserter systems. U.S. Pat. No.: 4,395,255; issued: July 26, 1983; to: Branecky et al; assigned to: Pitney Bowes Inc. teaches typical web handling equipment. Further discussion of sheet inserter systems and the mechanical aspects used in embodiments of the subject invention is not believed necessary for an understanding of the subject invention as described below and will not be discussed further herein.

In multi-web inserter systems forms from a plurality of web modules are assembled into a batch on a transport unit. Because this transport unit operates asynchronously with respect to the sheet inserter system, a transfer unit is provided to synchronize the transfer of forms from the transport unit to the sheet inserter system. Synchronously with the transfer of forms, the system transmits control information read from the appropriate control document to the sheet inserter system to specify which feeder modules were to add sheets to the batch and, perhaps, to specify the postage to be applied.

One problem which was encountered in such systems resulted when batches of documents failed to complete a transfer from the transport unit to the transfer unit. Since the control signals would have been transmitted, the sheet inserter unit would feed sheets accordingly, insert them into an envelope, and, perhaps, meter them. Since the corresponding forms had not been successfully transferred to the sheet inserter system, the inserted materials and metered postage were effectively lost.

Another problem in such system related to start-up and shut-down of the system. Unless the initial or final pieces were manually stopped through the system and the feeder modules turned on sequentially, sheets would be fed before or after batches were present to receive them.

Thus, it is an object of the subject invention to provide an inserter system which will eliminate unnecessary feeds of sheet materials when the associated forms have not been successfully transferred.

It is another object of the subject invention to provide an inserter system which reduces the wastage of metered postage.

It is still another object of the subject invention to provide a system with a simplified start-up and shutdown procedure.

BRIEF SUMMARY OF THE INVENTION

The above objects are achieved and the disadvantages of the prior art are overcome in accordance with the subject invention by means of an inserter system which includes at least one web module for assembling batches of forms, the forms including a control document in each of the batches and for generating control signals associated with each of the batches in accordance with information imprinted on the control document; a sheet inserter responsive to the control signals for adding sheets to the batches in accordance with the control signals; a transfer unit for transferring the batches from the web module to the sheet inserter; a detector for detecting the transfer of the batches to the transfer unit and for generating an output signal indicative of a successful transfer; and, a buffer unit responsive to the output signal for receiving the control signals when transfer of the associated batch begins and transmitting said control signals to the sheet inserter if and only if the transfer is successful.

In preferred embodiments of the inserter system of the subject invention, the inserter system includes a plurality of web modules and assembles the batches from a plurality of webs, and the web modules and the sheet inserter operate asynchronously.

In other preferred embodiments of the subject invention, the control signal may comprise a plurality of bits each bit indicating whether or not an associated feeder in the sheet inserter should feed a sheet into the associated batch; the buffer unit further includes first and second registers; the detector further includes first and second detectors, the first detector being positioned to provide a first signal indicating the beginning of transfer of the batch from the web modules to the transfer unit and the second detector being positioned to provide the output signal when the transfer to the transfer unit is successfully completed; the buffer unit is responsive to the first signal to load the bits into the first register and is responsive to the output signal to shift the bits from the first register to the second register; and further, the sheet inserter is responsive to the bits only after the bits are shifted to the second register, so that the sheet inserter will not attempt to add sheets to the associated batch unless the transfer of the batch is successful.

Accordingly, the subject invention advantageously achieves the above-mentioned objects and overcomes the disadvantages of the prior art. Other objects and advantages of the subject invention will be readily apparent to those skilled in the art from consideration of the detailed description of embodiments of the subject invention set forth below and consideration of the attached drawings.

DETAILED DESCRIPTION OF PREFERRED EMBODIMENTS OF THE INVENTION

Figure 1:
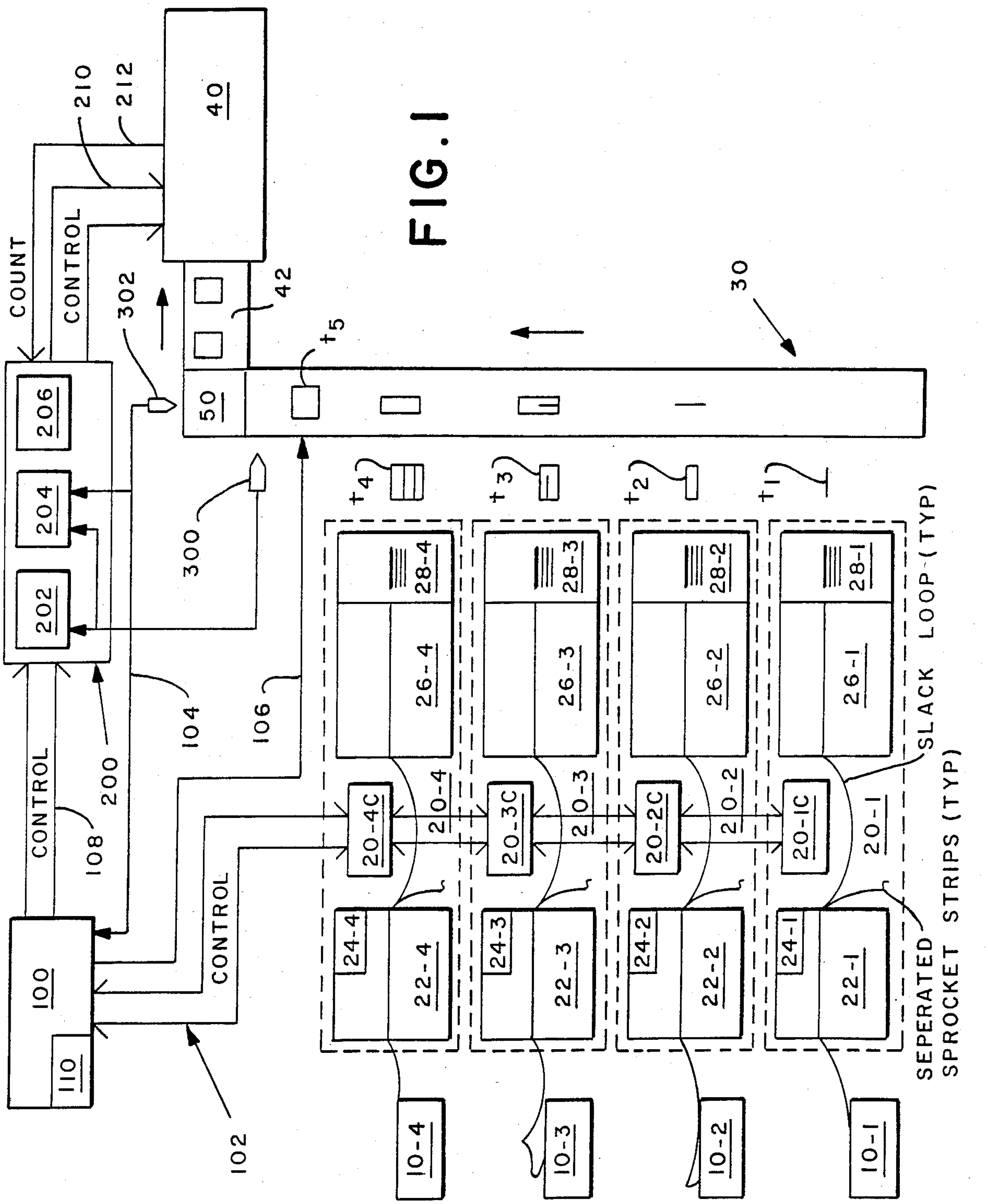
FIG. 1 shows a schematic representation of an inserter system including a multi-web inserter system and a sheet inserter system.

FIG. 1 shows a schematic representation of an inserter system in accordance with the subject invention. The system of FIG. 1 includes 4 web modules 20-1 through 20-4 which feed webs of computer print-out forms 10-1 through 10-4 into the system. Each web module 20 feeds a web 10, scans it for information, separates webs 10 into discrete forms and forms accumulations of discrete forms in accordance with the information scanned from a control form included in the most upstream web 10-1. These accumulations are then fed synchronously to transport unit 30. Selected accumulations from one or more of web modules 20 are gathered with the control document on transport unit 30 to form batches of forms for further processing. In FIG. 1, an example of this grouping of accumulations of forms into batches is shown at times $t_1$ through $t_5$. At $t_1$ the control form, possibly with an accumulation of non-control forms from web 10-1, is fed to transport unit 30 to begin grouping appropriate forms into a batch. At $t_2$ transport unit 30 moves the batch to web module 20-2 where, in accordance with information scanned from the control document an accumulation of forms from web module 20-2 is grouped with the batch. At $t_3$, the batch is moved to web module 20-3, where in accordance with the information scanned from the control document no accumulation of forms is added. Similarly, at $t_4$ an accumulation from web module 20-4 is added to the batch.

At $t_5$ the batch is fed to transfer unit 50 which transfers the batch to the transport unit 42 of sheet inserter module 40 where additional sheets may be added to the batch, the batch inserted in an envelope and appropriate postage imprinted on the envelope in accordance with the information scanned from the control document.

Sheet inserter system 40 and transfer unit 50 may be conventional units known and well understood by those skilled in the art, such as the INSERTAMAX II or INSERTAMAX III systems, available from the Pitney Bowes Corporation of Stamford, Conn. Alternatively, sheet inserter system 40 may be a more sophisticated system such as that described in the commonly assigned copending application entitled: Universal Multi-Station Document Inserter, Serial No.: 394,388, Filed: July 1, 1982, U.S. Pat. No. 4,547,856 To: Peter N. Piotroski and John M. Gomes, now issued as U.S. Pat. No. 4,547,856. Inserter system 40 includes a number of feeder modules (not shown) arranged along transport unit 42 for adding sheets to batches as they are stepped through the system, and may include accessorary units such as postage meters. Control of feeder modules (i.e., whether or not a sheet is added to a particular batch is in accordance with control signals which are transmitted to system 40 synchronously with the batch in a manner which will be more fully described below.

(Those skilled in the art will also recognize that the description of the subject invention has so far focused on a single batch as it moved through the system. However, they will also readily recognize that, given the high speed of electronic control systems in comparison to the mechanical operations of the inserter system, it would be a straight forward matter to concurrently control a number of batches moving sequentially through the system. However, though such concurrent control is in fact preferable, for the purpose of clarity the description of the subject invention herein will continue to focus on the sequence of operations on a single batch with the implicit understanding that other batches at other states of processing may proceed and follow the batch through the system.)

Returning to FIG. 1, web module 20-1 is typical of web modules used in embodiments of the subject invention. It comprises a forms feeder 22-1 which draws in web 10-1 by means of sprocket wheels engaged with sprocket strips fixed to the edges of web 10-1. Forms feeder 22-1 draws web 10-1 past scanner 24-1 and separates the sprocket strips from web 10-1 before feeding it to burster-folder 26-1.

Scanner 24-1 scans the forms in the web for machine readable information imprinted on the forms in the web. In module 20-1 this would include control information printed on control documents and, possibly, I.D. information printed on other, non-control, documents in web 10-1. In downstream modules 20-2 through 20-4 scanners 24-2 through 24-4 would scan for I.D. information. (Though those skilled in the art will recognize that inclusion of all control information on a single control document is preferable in terms of simplicity of operation, they will also recognize that additional control information may be included on documents fed by other modules and the response of the system modified in accordance with such additional control information.)

Burster-folder 26-1 separates web 10-1 into discrete forms and accumulates these forms in accumulator 28-1. In web module 20-1, the control document, and possibly a number of succeeding non-control forms from web 10-1, are accumulated in accumulator 28-1 in accordance with control information on the control document. In downstream web modules 20-2 through 20-4, other accumulations of discrete forms which are to be added to the batch defined by the control document may be accumulated. These accumulations are fed to transport unit 30 in synchronism so as to properly form the batch defined by the control document. As described above, this batch is then fed to transfer unit 50 and sheet inserter system 40 for further processing.

The mechanical aspects of handling webs such as 10-1 separating them into discrete forms, accumulating the forms, transferring the accumulations to a transport unit such as unit 30 and transporting the batches on transport unit 30 to a sheet inserter system such as 40 are known and well understood by those skilled in the art. Accordingly, a further description of the mechanical aspects of the inserter system of the subject invention is not believed necessary to an understanding of the subject invention and will not be provided herein; except to note that it is believed preferable to operate transport unit 30 asynchronously with transport unit 42 and to feed batches to transfer unit 50 and sheet inserter system 40 on a demand basis.

A more detailed description of multiple web inserter systems of the type shown in FIG. 1 is given in commonly assigned co-pending application entitled: Inserter System For Forming Predetermined Batches of Documents and Inserting The Batches Into Envelopes, Ser. No.: 665,687, Filed: Oct. 29, 1984, By: Peter N. Piotroski, now issued as U.S. Pat. No. 4,527,791.

Returning to FIG. 1 web modules 20-1 through 20-4 are controlled locally by module control systems 20-1C through 20-4C, while overall control is through system controller 100 communicating with module control systems 20-1C through 20-4C over bus 102. Control information is scanned by scanner 24-1 and includes information for controlling the feeder modules (not shown) of sheet inserter system 40. Signals corresponding to this information are transmitted over bus 102 to supervisory control 100, which maintains a que of such signals for transmittal to sheet inserter 40 over bus 108 and through buffer 200 in a manner which will be more fully described below.

Supervisory controller 100 receives a demand signal requesting the next batch of forms for sheet inserter 40 on line 104 and responds on line 106 to initiate transfer of a batch of forms to transfer unit 50.

Detectors 300 and 302 are positioned to detect batches as they pass from transport unit 30 through transfer unit 50 to transport unit 42 of sheet inserter 40. Detector 300 is positioned to detect a batch as the transfer to unit 50 begins and detector 302 is positioned to detect successful completion of transfer to unit 50. Signals from detectors 300 and 302 are used to control the flow of control signals through buffer 200 in a manner which will be described more fully below. Preferably, detectors 300 and 302 are conventional photodetectors and are well understood by those skilled in the art.

Figure 2:
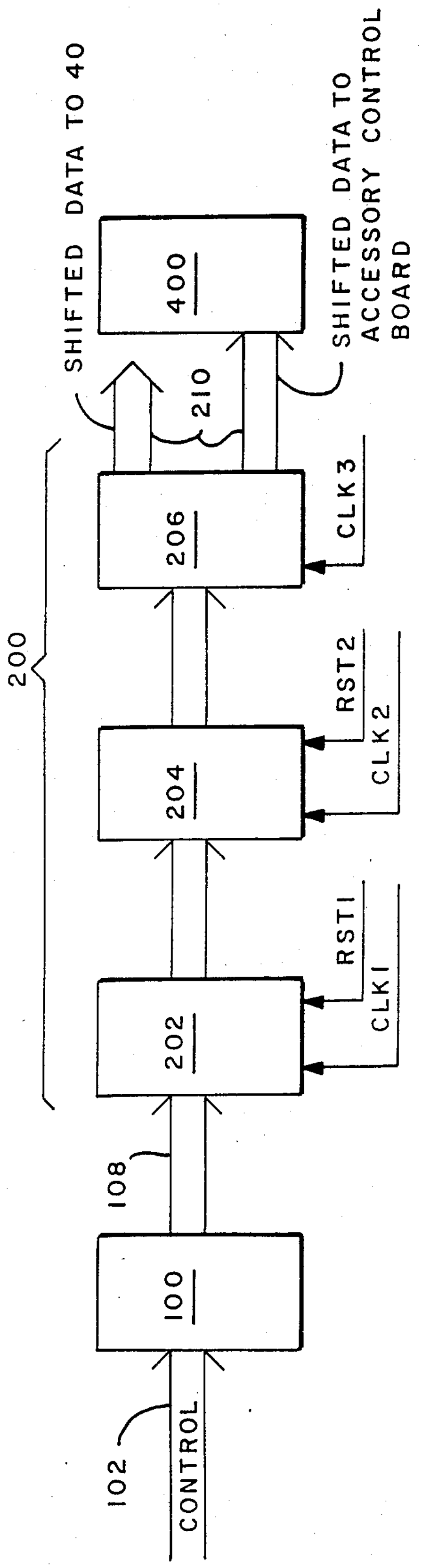
FIG. 2 shows a block diagram of a buffer unit for the inserter system of FIG. 1.
Figure 3:
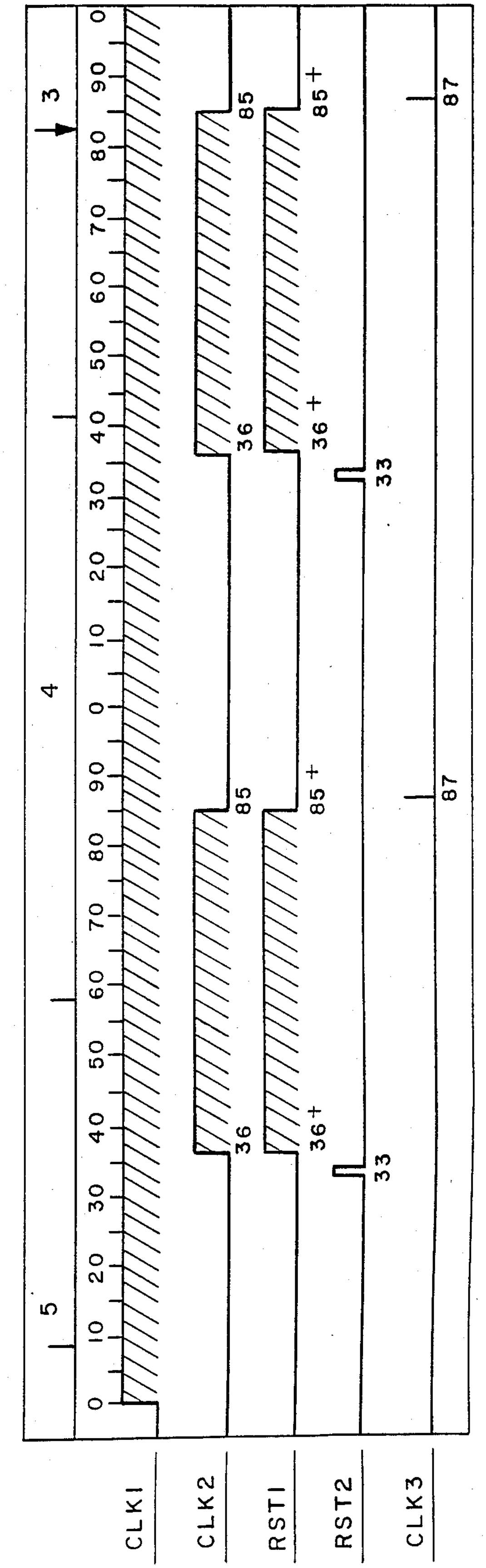
FIG. 3 shows a timing diagram of the operation of the buffer unit of FIG. 2.

Turning to FIGS. 2 and 3, a more detailed description of the operation of buffer 200 is shown. In supervisory controller 100 a que of control signals is maintained in sequence corresponding to the sequence of batches on transport unit 30. This que is stored in a storage device 110 which may be a shift register type device or may simply be a designated portion of microprocessor memory in supervisory controller 100. The control signals consist of a plurality of binary bits formed into data words with the data word corresponding to the next batch on transport unit 30 to be transferred to transfer unit 50 being maintained on bus 108. Each feeder module in sheet inserter system 40 corresponds to a particular bit or bits in the control signal data words and operation of that feeder module with respect to a particular batch is determined in accordance with the state of that bit or bits (e.g, a module will feed or not feed depending upon whether its associated bit is set or not set).

The data word is clocked into register 202 by a signal CLK1 which is developed from the output signal XPC of detector 300. Detector 300 is positioned so that XPC is asserted when a batch starts to move into transfer unit 50 and blocks detector 300. XPC returns to the unasserted state when the batch clears detector 300 and CLK1 is developed from and coincides with the trailing edge of XPC. Since transport unit 30 and sheet inserter system 40 operate asynchronously, clock 1 may occur any time in a cycle of sheet inserter 40 as is shown in FIG. 3.

As noted above, sheet inserter 40 operates cyclically and accordingly batches must be introduced into system 40 within a defined window in each cycle in order to maintain synchronism. To maintain synchronism of the control information, sheet inserter system 40 includes an encoder to generate a clock count signal. This clock count signal is transmitted to buffer 200 on line 212 in FIG. 1 and is used to assure that the control signal is transferred to sheet inserter system 40 in synchronism with the associated batch. In the embodiment shown in FIGS. 2 and 3 the control signal is transmitted in synchronism with the associated batch within a window defined by clock counts 36–85 by the signal CLK2. CLK2 is developed from the output signal TPC of detector 302 which is positioned to detect the successful completion of the transfer of a batch to unit 50. CLK2 is defined as the logical combination (not XPC) (TPC) (COUNT 36 to 85). The signal RST1 is developed from the trailing edge of CLK2 to clear register 202 after the data is transmitted to register 204. Register 204 is cleared by clock count 33 just before the window for CLK2. Preferably, the trailing edge of TPC may be transmitted back to supervisory controller 100 to indicate that the next available batch may be transferred to transfer unit 50.

From the above description, it is apparent that if for any reason a transfer is begun but not completed, will not result in the transmission of the control signal from register 202 to register 204, since TPC will not be asserted. As a result, feeder modules and other accessory units in sheet inserter system 40 will not operate and the loss the materials and postage will be avoided.

Once the control signals are transmitted to register 204, they are then transmitted to register 206 by a periodic signal CLK3 which coincides with clock count 87 in the abovedescribed embodiments. Register 206 comprises a plurality of shift registers associated with each bit in the control signal data word, and which have varying lengths. At each occurrence of CLK3 a new data word is shifted into the first stages of register 206 and preceeding data words are each shifted down one stage. The lengths of the shift registers in register 206 are selected so that each bit in the data word arrives at its associated feeder module, or other accessory units, synchronously with its associated batch. As can be seen from FIG. 2, portions of the data may be transmitted to an accessory module control unit 400 to control accessory modules such as postage meters (not shown) in a conventional manner which need not be described further here for an understanding of the subject invention.

The shifting of data through register 206 to synchronize bits of the control signal data word with the progress of the associated batch through the inserter system is well known in the inserter art. However, it should be noted that in prior art systems, control signals were transmitted to registers substantially equivalent to register 204 each time a transfer of a batch from transport unit 30 to transfer unit 50 was initiated. As a result, if the transfer were not successful, the feeder modules (not shown) and postage meters (not shown), etc., would be operated in accordance with the control signal in the absence of a batch resulting in the loss of materials and the wastage of postage.

Further, because no control signal is transferred to register 204 unless TPC is generated by detector 302, no spurious control signals can be transmitted to register 206 unless the associated batch is transferred to the sheet inserter system. Accordingly, the problem of sheets fed before or after batches are available is avoided and start-up or shut-down operations do not require manual intervention or sequentially turning on, or off, of the feeder modules.

The above described preferred embodiments have been given by way of illustration of the subject invention only, and many other embodiments will be readily apparent to those skilled in the art from consideration of the above description and the attached drawings. Accordingly, limitations on the scope of the subject invention are to be found only in the claims set forth below.

What is claimed is:

1. An inserter system comprising:

a. a web means for assembling batches of forms, said forms including a control document in each of said batches, and for generating control signals associated with each of said batches in accordance with information imprinted on said control document;

b. sheet inserter means responsive to said control signals for adding sheets to said batches of forms in accordance with said control signals;

c. transfer means intermediate said web means and said sheet inserter means for transferring said batches from said web means to said sheet inserter means;

d. detector means for detecting the transfer of said batches to said transfer means and for generating an output signal indicative of successful transfer; and, e. buffer means responsive to said detector means for receiving said control signals when transfer of said associated batch begins and transmitting said control signals to said sheet inserter if, and only if, said transfer is successfully completed.

2. An inserter system as described in claim 1 wherein said web means comprises a plurality of web modules and assembles said batches of forms from a plurality of webs.

3. An inserter system as described in claim 1 wherein said web means and said sheet inserter means operate asynchronously.

4. An inserter system as described in claim 2 wherein said web means and said sheet inserter means operate asynchronously.

5. An inserter system as described in claim 3 wherein:

a. said control signal comprises a plurality of bits, each of said bits indicating whether or not an associated feeder module should feed a sheet into said associated batch;

b. said buffer means comprising first and second registers;

c. said detector means comprises first and second detectors, said first detector being positioned to provide a first signal indicative of the beginning of transfer of said batch from said web means to said transfer means and said second detector being positioned to provide said output signal when said transfer to said transfer means is successfully completed;

d. said buffer means is responsive to said first signal to load said bits into said first register and is responsive to said output signal to shift said bits from said first register to said second register; and, e. said sheet inserter means is responsive to said bits only after said bits are shifted to said second register, whereby said sheet inserter means will not attempt to add sheets to said associated batch unless said transfer of said batch is successful.

6. An inserter system as described in claim 4 wherein:

a. said control signal comprises a plurality of bits, each of said bits indicating whether or not an associated feeder module should feed a sheet into said associated batch;

b. said buffer means comprising first and second registers;

c. said detector means comprising first and second detectors, said first detector being positioned to provide a first signal indicative of the beginning of transfer of said batch from said web means to said transfer means and said second detector being positioned to provide said output signal when said transfer to said transfer means is successfully completed;

d. said buffer means is responsive to said first signal to load said bits into said first register and is responsive to said output signal to shift said bits from said first register to said second register; and, e. said sheet inserter means is responsive to said bits only after said bits are shifted to said second register, whereby said sheet inserter means will not attempt to add sheets to said associated batch unless said transfer of said batch is successful.

7. An inserter system as described in claim 5 wherein:

a. said sheet inserter means operates cyclically, each batch in said sheet inserter means progressing to the next feeder module or to the output of said sheet inserter system and a new batch being transferred to said sheet inserter system during each cycle;

b. said sheet inserter means generates a clock signal synchronous with said cycles;

c. said buffer means is responsive to said clock to define a window during which said bits may be shifted from said first register to said second register, said window being defined by the period within said cycles during which said batches may be transferred from said transfer means to said sheet inserter means.

8. An inserter system as described in claim 6 wherein:

a. said sheet inserter means operates cyclically, each batch in said sheet inserter means progressing to the next feeder module or to the output of said sheet inserter system and a new batch being transferred to said sheet inserter system during each cycle;

b. said sheet inserter means generates a clock signal synchronous with said cycles;

c. said buffer means is responsive to said clock to define a window during which said bits may be shifted from said first register to said second register, said window being defined by the period within said cycles during which said batches may be transferred from said transfer means to said sheet inserter means.

9. An inserter system as described in claim 7 wherein:

a. said first detector detects the presence or absence of a batch at the input to said transfer unit and said first signal is generated by the trailing edge of the output of said first detector, indicating that said batch has passed said first detector;

b. said second detector detects the presence or absence of said batch in said transfer means and said output signal is generated by logically adding the output of said second detector, the negated output of said first detector and said window; and, c. the trailing edge of the output of said second detector, indicating that said batch has been transferred from said transfer means to said sheet inserter means, generates a return signal to said web means to enable said web means to feed the next batch to said transfer means.

10. An inserter system as described in claim 8 wherein:

a. said first detector detects the presence or absence of a batch at the input to said transfer unit and said first signal is generated by the trailing edge of the output of said first detector, indicating that said batch has passed said first detector;

b. said second detector detects the presence or absence of said batch in said transfer means and said output signal is generated by logically adding the output of said second detector, the negated output of said first detector and saidi window; and, c. the trailing edge of the output of said second detector, indicating that said batch has been transferred from said transfer means to said sheet inserter means, generates a return signal to said web means to enable said web means to feed the next batch to said transfer means.

* * * * *